United States Patent
Yang et al.

(10) Patent No.: US 7,957,345 B2
(45) Date of Patent: Jun. 7, 2011

(54) ADAPTIVE HARQ IN AN OFDMA BASED COMMUNICATION SYSTEM

(75) Inventors: Yunsong Yang, San Diego, CA (US); Anthony C. K. Soong, Plano, TX (US); Jianmin Lu, San Diego, CA (US)

(73) Assignee: FutureWei Technologies, Inc., Plano, TX (US)

( * ) Notice: Subject to any disclaimer, the term of this patent is extended or adjusted under 35 U.S.C. 154(b) by 1019 days.

(21) Appl. No.: 11/685,497

(22) Filed: Mar. 13, 2007

(65) Prior Publication Data

US 2008/0037664 A1 Feb. 14, 2008

Related U.S. Application Data

(60) Provisional application No. 60/784,585, filed on Mar. 20, 2006.

(51) Int. Cl.
*H04W 4/00* (2009.01)
(52) U.S. Cl. ............................ 370/329; 455/450; 455/69
(58) Field of Classification Search .......... 455/450–454, 455/69; 370/329–330
See application file for complete search history.

(56) References Cited

U.S. PATENT DOCUMENTS

| | | | |
|---|---|---|---|
| 6,571,099 B1 | 5/2003 | Kim et al. | |
| 6,980,811 B2 | 12/2005 | Harris | |
| 7,505,417 B2 * | 3/2009 | Huh et al. | 370/245 |
| 2002/0152342 A1 * | 10/2002 | Das et al. | 710/117 |
| 2003/0017830 A1 | 1/2003 | Kayama et al. | |
| 2003/0067935 A1 | 4/2003 | Hosein | |
| 2004/0258026 A1 | 12/2004 | Lau | |
| 2005/0111488 A1 | 5/2005 | Subramanian et al. | |
| 2005/0141454 A1 * | 6/2005 | Jain et al. | 370/331 |
| 2005/0180349 A1 | 8/2005 | Alamouti et al. | |
| 2005/0197129 A1 | 9/2005 | Cho et al. | |
| 2005/0265434 A1 | 12/2005 | Watanabe | |
| 2006/0003794 A1 | 1/2006 | Chung et al. | |
| 2006/0094363 A1 | 5/2006 | Kang et al. | |
| 2006/0256887 A1 | 11/2006 | Kwon et al. | |
| 2007/0004437 A1 * | 1/2007 | Harada et al. | 455/506 |
| 2007/0070905 A1 | 3/2007 | Oliver et al. | |
| 2007/0201398 A1 | 8/2007 | Yang et al. | |
| 2007/0206623 A1 * | 9/2007 | Tiedemann et al. | 370/431 |
| 2007/0218915 A1 | 9/2007 | Yang et al. | |
| 2007/0223606 A1 | 9/2007 | Yang et al. | |

(Continued)

OTHER PUBLICATIONS

Kitroser, I., et al., "OFDMA MAC-PHY Section Details," IEEE 802.16 Broadband Wireless Access Working Group, Aug. 29, 2001, pp. 0-19, IEEE.

(Continued)

*Primary Examiner* — Kamran Afshar
*Assistant Examiner* — Vladimir Magloire
(74) *Attorney, Agent, or Firm* — Slater & Matsil, L.L.P.

(57) ABSTRACT

The present invention discloses constructs and methods for transmitting a HARQ re-transmission in an adaptive manner in a wireless communication system. The system of the present invention discloses: scheduling the re-transmission of a data packet, based on decoding results from a receiver; determining a plurality of parameters for re-transmission in an adaptive manner; sending an assignment message if required; using a plurality of fields in the assignment message for re-transmission to indicate the plurality of parameters in the re-transmission; using a MACID field in the assignment message for re-transmission to indicate a target mobile station for the re-transmission; transmitting a data packet for the re-transmission; and decoding the data packet at the receiver to determine if a further need of re-transmission exists.

9 Claims, 3 Drawing Sheets

U.S. PATENT DOCUMENTS

| | | |
|---|---|---|
| 2007/0263711 A1 | 11/2007 | Theodor Kramer et al. |
| 2007/0263735 A1 | 11/2007 | Tong et al. |
| 2007/0268816 A1 | 11/2007 | Hosein |
| 2009/0080575 A1 | 3/2009 | Chuang et al. |
| 2009/0196164 A1 | 8/2009 | Vook et al. |

OTHER PUBLICATIONS

"Downlink Multiplexing for EUTRA," 3GPP TSG-RAN WG1 Meeting #42bis, Tdoc R1-051220, Oct. 10-14, 2005, 5 pages, Samsung.

"E-URTA Resource Allocation Design for Downlink," 3GPP TSG-RAN WG1 #43, R1-051359, Nov. 7-11, 2005, 12 pages, ZTE.

"Updated Lucent-Nortel-Samsung proposal for Air Interface Evolution Phase 2," 3GPP2 TSG-C WG3, C30-20060327-018, Mar. 30, 2006, pp. 1, 29-34, 3GPP2.

Song, G., et al., "Adaptive Subcarrier and Power Allocation in OFDM Based on Maximizing Utility," The $57^{th}$ IEEE Semiannual Vehicular Technology Conference, Apr. 22-25, 2003, 5 pages.

\* cited by examiner

ADAPTIVE HARQ IN AN OFDMA BASED COMMUNICATION SYSTEM

PRIORITY CLAIM AND CROSS-REFERENCE TO RELATED APPLICATIONS

This application claims the priority of U.S. Provisional Application No. 60/784,585, filed Mar. 20, 2006.

This application is related to: the co-pending U.S. applications for patent Ser. No. 11/679,060, filed Feb. 26, 2007, entitled "Method And Apparatus For Wireless Resource Allocation", by Yunsong Yang, Anthony Soong, Jianmin Lu, and Patrick Hosein; and Ser. No. 11/688,721, filed Mar. 12, 2007, entitled "Wireless Communication Resource Allocation And Related Signaling" by Yunsong Yang, Anthony Soong, Jianmin Lu, and Patrick Hosein. The above-identified related applications are assigned to the assignee of the present invention and hereby incorporated herein for all purposes.

TECHNICAL FIELD OF THE INVENTION

The present invention generally relates to Hybrid Automatic Repeat Request (HARQ) messages in a wireless communication system and, more specifically, to a novel system for transmitting HARQ messages in orthogonal frequency division multiplexing (OFDM) and orthogonal frequency division multiple access (OFDMA) communication systems.

BACKGROUND OF THE INVENTION

In wideband wireless communications systems, data signals tend to deteriorate due to a number of transmission factors—such frequency selective fading due to multi-path transmissions, for example. An OFDM system has been proposed to overcome the problem of frequency selective fading by dividing the total bandwidth into a plurality of subcarriers such that the bandwidth on each subcarrier can carry the data modulation symbols but is sufficiently narrow to experience relatively flat fading.

The OFDMA system uses an OFDM modulation technique to multiplex the traffic data of a plurality of mobile stations in both frequency and time. In a cellular network or an ad hoc network, some mobile stations are moving at a fast speed while the other mobile stations are more stationary when they transmit or receive data. Some mobile stations experience severe fading due to multi-path transmission while others have near line-of-sight channels with a base station antenna. Therefore, two assignment methods have been proposed for an OFDMA-based wireless communications system. A localized assignment method assigns the subcarriers that are contiguous in both time and frequency to one mobile station. A distributed assignment method assigns the subcarriers that are not contiguous in both time and frequency.

SUMMARY OF THE INVENTION

The present invention discloses a system, including various constructs and methods, for transmitting a sub-packet for HARQ re-transmission in an adaptive manner. According to the present invention, an assignment message and initial sub-packet for a data packet to a mobile station is transmitted by a base station. The assignment message is decoded by the mobile station, and a positive or negative acknowledgement is sent back to the base station, indicating success or failure of proper decoding. HARQ re-transmission of the data packet to the mobile station is scheduled if a negative decoding result is received.

A plurality of parameters for the re-transmission are determined in an adaptive manner. The assignment message for the HARQ retransmission is sent if required; and a plurality of fields in that message are used to communicate the plurality of parameters for the re-transmission.

A MAC ID field in the assignment message for the re-transmission is utilized to identify the target mobile station for re-transmission. The subsequent sub-packet of the data packet for re-transmission is sent, and decoded at the receiver to determine if a further need of re-transmission exists.

The present invention also discloses a procedure for a base station to determine necessity of sending an assignment message for re-transmission. Further, the present invention discloses a system for a base station transferring transmit power on a channel that carries the assignment message for re-transmission.

The present invention thus provides versatile methods and apparatus to support HARQ re-transmission in an adaptive manner, in order to fit into various multiplexing modes of two types of assignments in a frame during re-transmission. The present invention enables a base station to perform in this manner with minimal signaling overhead. The present invention further provides a scheme for a base station to determine when it is necessary to send an assignment message for a re-transmission The following description and drawings set forth in detail a number of illustrative embodiments of the invention. These embodiments are indicative of but a few of the various ways in which the present invention may be utilized.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

The following discussion is presented to enable a person skilled in the art to make and use the invention. The general principles described herein may be applied to embodiments and applications other than those detailed below without departing from the spirit and scope of the present invention as defined herein. The present invention is not intended to be limited to the embodiments shown, but is to be accorded the widest scope consistent with the principles and features disclosed herein.

The present invention provides a unique method and system for Adaptive Hybrid ARQ in An OFDMA Based Communication System. It is understood, however, that the following disclosure provides many different embodiments, or examples, for implementing different features of the invention. Specific examples of components, signals, messages, protocols, and arrangements are described below to simplify the present disclosure. These are, of course, merely examples and are not intended to limit the invention from that described in the claims. Well known elements are presented without detailed description in order not to obscure the present invention in unnecessary detail. For the most part, details unnecessary to obtain a complete understanding of the present invention have been omitted.

Figure 1:
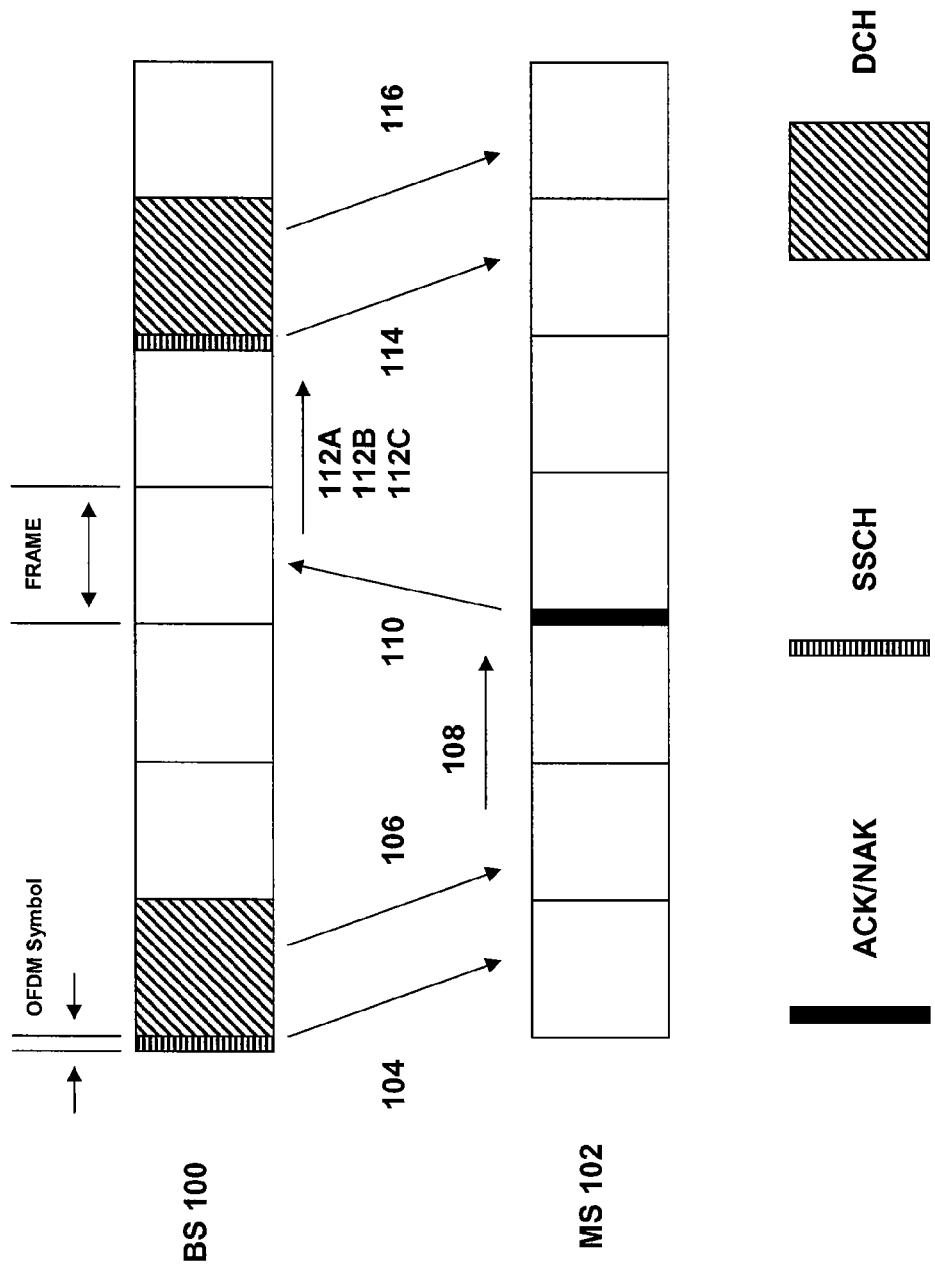
FIG. 1 illustrates an embodiment of a timing relationship for forward link HARQ according to the present invention.
Figure 2:
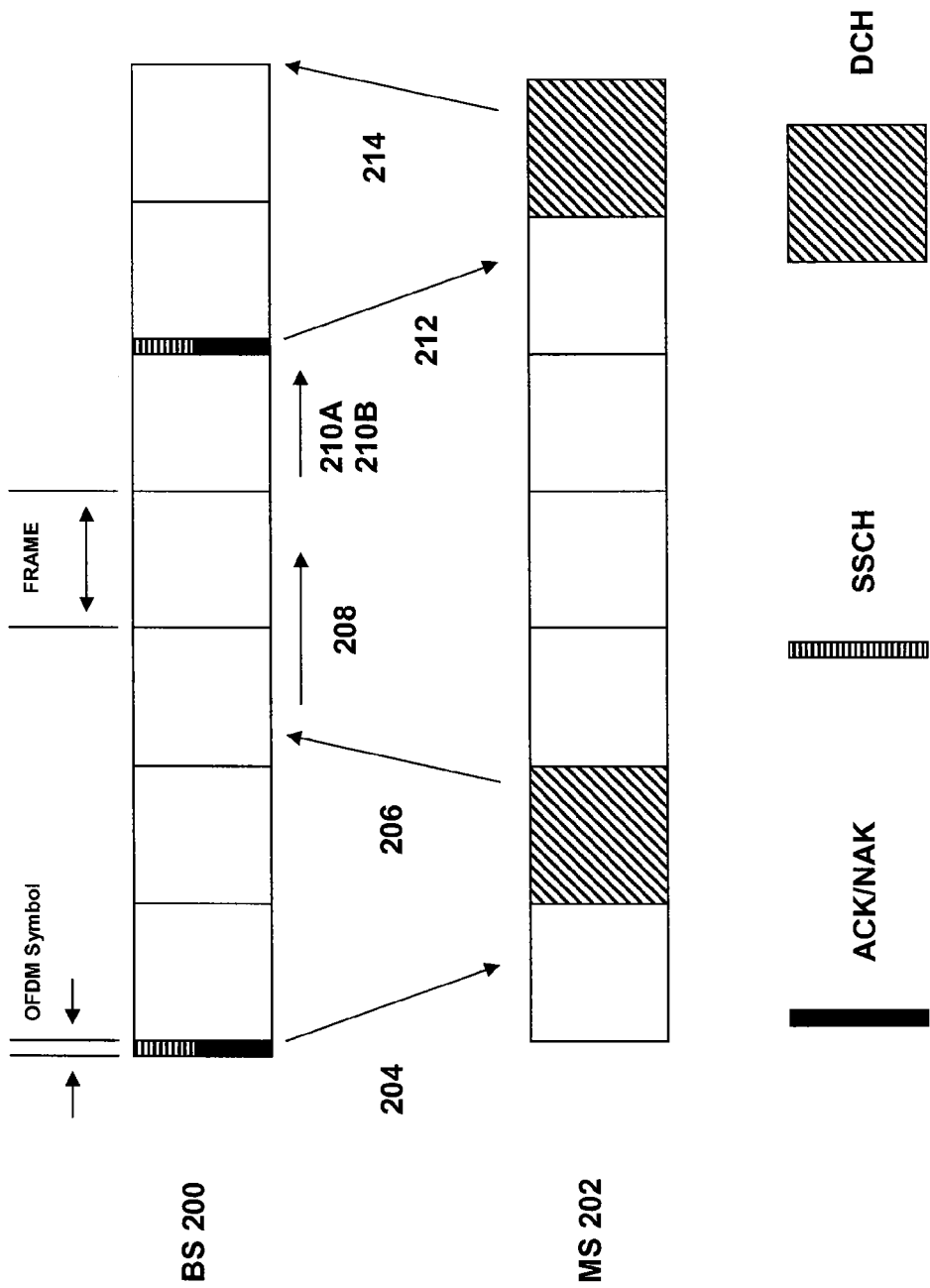
FIG. 2 illustrates an embodiment of a timing relationship for reverse link HARQ according to the present invention.

According to one aspect of the invention, FIGS. 1 and 2 illustrate the processing steps and the timing relationship of HARQ for the forward link (FL) and the reverse link (RL), respectively. Referring to FIG. 1 which illustrates the FL HARQ operation, the base station 100 transmits 104 the assignment messages to the scheduled mobile station 102 using the shared scheduling channel (SSCH) in the first OFDM symbol of a frame. The mobile station 102 then decodes all the assignment messages and determines if an assignment message for the mobile station 102 is detected.

The base station 100 then transmits 106 the data packets for the scheduled mobile stations according to the assignment messages using the data channel (DCH) for the rest of the data frame. In addition, if there are multiple-input-multiple-output (MIMO) transmissions, the base station may also include the assignment messages for the other layers of the MIMO transmission as a preamble of the data packet of the first layer transmission 106 in the DCH. Moreover, the assignment message for the first layer is sent 104 with the shared scheduling channel.

If the mobile station determines an assignment message for the mobile station is detected, then the mobile station decodes 108 the data packet for the mobile station. If the mobile station decodes 108 the data packet correctly, then the mobile station sends 110 an ACK, otherwise the mobile station sends 110 a NACK. The base station then decodes 112A the ACK/NACK signals from all previously scheduled mobile stations, detects 112B the FL channel condition feedbacks from all mobile stations, and schedules 112C the data transmissions including the HARQ re-transmissions for the next frame. If the base station detects a NACK from a mobile station in, the base station may send 114 an assignment message, to that mobile station for the re-transmission. Then the base station re-transmits 116 the previously failed data packet according to the incremental redundancy or chasing combining.

Referring now to FIG. 2, for the RL HARQ operation, the base station initially transmits 204 the assignment messages to the scheduled mobile stations using the SSCH in the first OFDM symbol of a frame. The mobile station then decodes all assignment messages and determines if an assignment message for the mobile station is detected. If the mobile station determines an assignment message for the mobile station is detected, then the mobile station transmits 206 the data packets according to the assignment message using the DCH for the rest of the data frame. The base station then decodes 208 all data packets for the scheduled mobile stations. If the base station decodes the data packet for a mobile station correctly, the base station sends 212 an ACK to the mobile station. Otherwise, the base station sends 212 a NACK to the mobile station. The base station detects 210A the RL channel conditions for all mobile stations, and schedules 210B the data transmissions on the RL including the HARQ re-transmissions for the next frame depending on at least, but not limited to, the RL channel condition and ACK/NACK situation of the previous transmission for each mobile station. If the base station sends 212 a NACK to a mobile station, the base station may also send 212 an assignment message for the re-transmission. Then, the mobile station re-transmits 214 the previously failed data packet according to the incremental redundancy or chasing combining.

According to the embodiments illustrated in FIGS. 1 and 2, the HARQ interlacing period is 5 frames. A person of the ordinary skill in the art will understand that other interlacing periods are possible.

According to another aspect of the present invention, the frame boundaries of the transmitted FL frame and the received RL frame at the base station antenna may be aligned or it may be offset by an integer number of OFDM symbols to support the HARQ timing for various cell sizes. When the cell size is large and the round-trip propagation delay of the signal is longer than a certain threshold, the offset becomes necessary to allow the mobile station to have enough time to decode 204 the ACK/NACK and/or assignment messages from the base station and to assemble the modulation symbols and waveforms accordingly, before transmitting 206 the waveforms.

Figure 4:
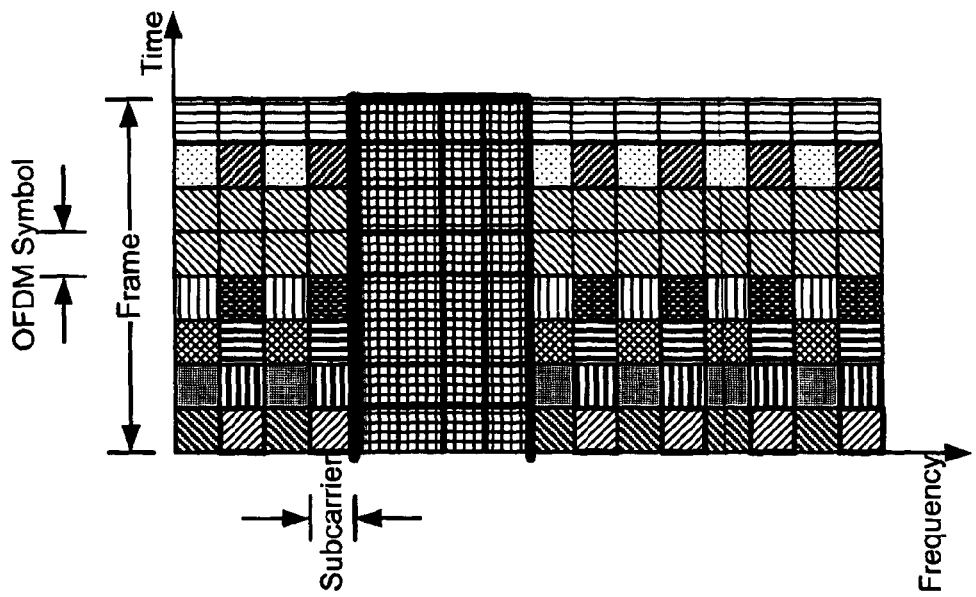
FIGS. 3 and 4 illustrate two exemplary modes of multiplexing two types of radio resource assignments in one frame in accordance with the present invention.
Figure 3:
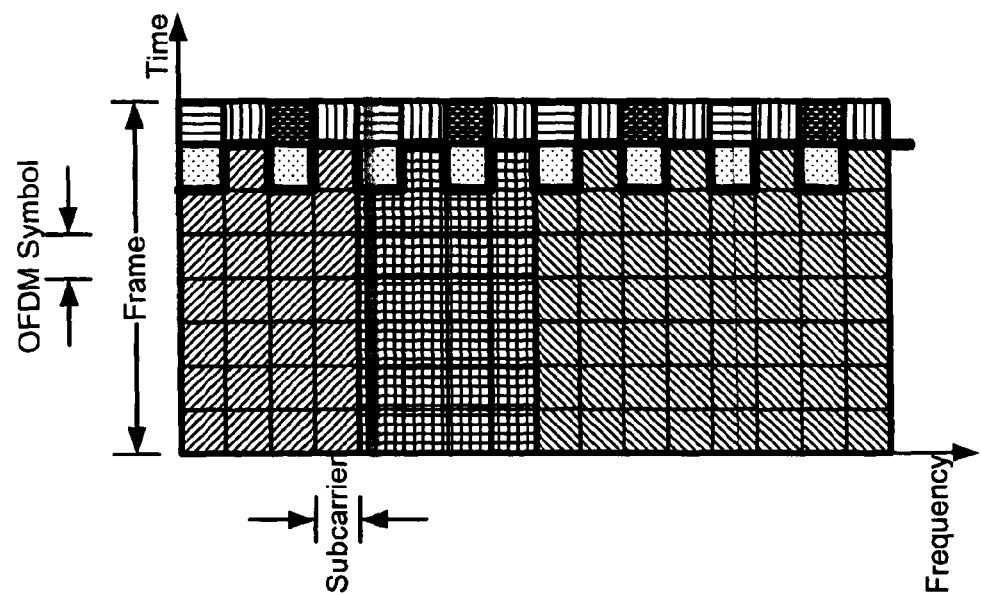

According to the disclosure in the cross referenced application entitled "Method and Apparatus for Wireless Resource Allocation", FIGS. 3 and 4 illustrate examples of two modes of multiplexing two types of assignments in one frame. According to the disclosure in the cross referenced application entitled "Wireless Communication Resource Allocation and Related Signaling", an alternative embodiment of multiplexing two types of assignment with two possible modes are also disclosed. In both disclosures, the base station assigns the distributed assignment units according to a certain sequence such that the last distributed assignment implicitly indicates which resource units are used by the distributed assignments collectively.

According to yet another aspect of the present invention, the base station can re-transmit a previously failed data packet using a different assignment type from the assignment type that is used for the previously failed transmission. For example, if the base station uses the distributed assignment for the initial transmission and the initial transmission fails, the base station can use the localized assignment for the re-transmission. When the base station changes the assignment type for the re-transmission, the base station will send an assignment message to the mobile station to inform the mobile station.

According to yet another aspect of the present invention, the base station can re-transmit a previously failed data packet in a new frame using a different multiplexing mode from the multiplexing mode that was used in the previously failed transmission. For example, if the base station uses a first multiplexing mode in the frame of an initial transmission, no matter what assignment type the initial transmission uses, and the initial transmission fails, the base station can use a second multiplexing mode in the re-transmission. When the base station changes the multiplexing mode in the re-transmission, the base station may need to send an assignment message to the mobile station to inform the mobile station.

According to the disclosure in the cross referenced application entitled "Method and Apparatus for Wireless Resource Allocation", each assignment message contains at least a field of a Media Access Control Index (MACID) to identify the intended mobile station for the assignment message, a field of Node Index (NodeID) to identify the assigned radio resource in time and frequency, a field of Assignment Type to identify whether the assignment is a localized resource channel (LRCH) assignment or a distributed resource channel (DRCH) assignment, a field of Packet Format (PF) to identify the encoder packet size, modulation level, and a code rate of the data packet. A person of the ordinary skill in the art will understand, the assignment message may contain other fields including, but not limited to, fields for message type and multiple antenna mode. According to the disclosure in the cross referenced application entitled "Method and Apparatus for Wireless Resource Allocation", the field of Assignment Type in the F-SSCH can be eliminated in a simplified scheme by limiting the localized assignment units to those with a first set of sizes and limiting the distributed assignment units to those with a second set of sizes. However, in this scenario, none of the sizes in the first set exists in the second set and none of the sizes in the second set exists in the first set. For example, in the 5 MHz system illustrated above, the localized assignment units can be limited to $L_0^1$, $L_i^2$, $L_j^4$, and $L_m^8$. Meanwhile, the distributed assignment units can be limited to $D_x^{16}$ and $D_y^{32}$, where i, j, m, x, y are integers, and $0 \leq i \leq 1$, $0 \leq j \leq 3$, $0 \leq m \leq 7$, $0 \leq x \leq 15$, and $0 \leq y \leq 31$. Therefore, the assignment size implies which assignment type is used and the need for an explicit field of Assignment Type in the F-SSCH is illuminated.

According to yet another aspect of the present invention, the base station may use different subcarrier-time bins to re-transmit the failed data packet to the mobile station from the bins assigned to the initial transmission. The base station may reduce the number subcarrier-time bins if the base station believes the earlier transmission is close to success and only a smaller number of redundant modulation symbols are needed for the re-transmission. The base station may increase the number subcarrier-time bins if the base station wants to transmit more redundant modulation symbols so that the HARQ re-transmission can be completed successfully before the target number or the maximum number of HARQ re-transmission. In addition, the base station may change the location of the subcarrier-time bins for the re-transmission. In all the cases described above, the base station will send an assignment message to the mobile station to inform the mobile station about the changes.

In one embodiment of the HARQ re-transmission, the base station sends the assignment message with a new NodeID to indicate the changes in the subcarrier-time bins for the re-transmission as described above. In this embodiment, the new NodeID will indicate the total subcarrier-time bins assigned for the re-transmission. However, the new NodeID may just indicate the change of the location of the subcarrier-time bins without changing the total number of the subcarrier-time bins.

In another embodiment, the new NodeID will be interpreted by the mobile station as an incremental change (i.e. adding to the existing resource assigned) or a decremental change (i.e. removing from the existing resource assigned). In addition to the NodeID, the base station will indicate to the mobile station which way the mobile station should interpret the new NodeID.

According to yet another aspect of the present invention, when the base station sends the assignment message for the HARQ re-transmission, the PF field in that assignment message will be a special combination. For example, "111111" can be used to indicate that the data packet is for a re-transmission, while all the other combinations of the PF field indicate valid values for the packet format.

In another embodiment, a first special combination, such as "111111", in the PF field is used to indicate that the data packet is for a re-transmission and the modulation level on the DCH is maintained as the before. Additionally, a second special combination, such as "111110", in the PF field is used to indicate that the data packet is for a re-transmission and the modulation level on the DCH is reduced to one level below the previous modulation level. All the other combinations of the PF field indicate valid values for the packet format. The modulation level on the DCH can be, in an ascending order of the modulation levels, Binary Phase Shift Keying (BPSK), Quadrature Phase Sift Keying (QPSK), 8-phase Phase Sift Keying (8PSK), 16-phase Quadrature Amplitude Modulation (16QAM), 32-phase Quadrature Amplitude Modulation (32QAM), or 64-phase Quadrature Amplitude Modulation (64QAM).

In yet another embodiment, a third special combination, such as "1111101", in the PF field can be used to indicate that the data packet is for a re-transmission and the modulation level on the DCH is increased to one level above the previous modulation level. All the other combinations of the PF field indicate valid values for the packet format.

In addition to the rules and procedures that determine if the base station needs to send an assignment message for a re-transmission as described above, in some cases where the base station does not change the modulation level, or the number of the subcarrier-time bins, or the location of the subcarrier-time bins, or the assignment type for the re-transmission, the base station may still need to send the assignment message with the NodeID and Assignment Type of the previous transmission to inform the mobile stations that are scheduled for transmission in the same frame as the re-transmitted packet about which subcarrier-time bins will be used by the re-transmitted packet. Table 1 below illustrates various cases where the base station needs or does not need to send the assignment message with the SSCH for the re-transmission in the cases where even though the modulation level, the number of the subcarrier-time bins, and the assignment type for the re-transmission do not change in the re-transmission. The Table also explains why the assignment message for the re-transmission is needed. Therefore, Table 1 can be used for the base station to determine if there is a need to send the assignment message with the SSCH for the re-transmission in the cases where the modulation level, the number of the subcarrier-time bins, and the assignment type for the re-transmission do not change in the re-transmission. Table 1 can also be used to determine how the base station puts the transmit power on the SSCH that carries the assignment message for the re-transmission.

TABLE 1

| Cases | Old Frame Multiplexing Mode | New Frame Multiplexing Mode | The Need and Reason for SSCH for Retransmission |
|---|---|---|---|
| Initial LRCH failed | 2nd mode | 2nd mode | Yes. To inform all DRCH users in the new frame of the NodeID of the failed LRCH. |
| | | 1st mode | No. |
| | 1st mode | 2nd mode | Yes. To inform all DRCH users in the new frame of the NodeID of the failed LRCH. |
| | | 1st mode | No. |
| Initial DRCH failed | 2nd mode | 2nd mode | Yes if the new Last DRCH is the failed DRCH. To inform all users in the new frame of the multiplexing mode. |

TABLE 1-continued

| Cases | Old Frame Multiplexing Mode | New Frame Multiplexing Mode | The Need and Reason for SSCH for Retransmission |
|---|---|---|---|
| | | 1st mode | No if the new Last DRCH is not the failed DRCH. Yes if the new Last DRCH is the failed DRCH or has a smaller index than the failed DRCH. To inform all users in the new frame of the multiplexing mode if the new Last DRCH is the failed DRCH; or to re-locate the failed DRCH to be within the index of the new Last DRCH if the new Last DRCH has a smaller index than the failed DRCH. No if the new last DRCH has a larger index than the failed DRCH. |
| | 1st mode | 2nd mode | Yes if the failed DRCH is the Last DRCH in the new frame. To inform all users in the new frame of the multiplexing mode. No if the failed DRCH is not the Last DRCH in the new frame. |
| | | 1st mode | Yes if the new Last DRCH is the failed DRCH or the new Last DRCH has a smaller index than the failed DRCH. To inform all users in the new frame of the multiplexing mode if the new Last DRCH is the failed DRCH; or to re-locate the failed DRCH to be within the index of the new Last DRCH if the new Last DRCH has a smaller index than the failed DRCH. No if the new Last DRCH has a larger index than the failed DRCH. |

The various illustrative logical blocks, modules, and circuits described in connection with the embodiment disclosed herein may be implemented or performed with, but not limited to, a general purpose processor, a digital signal processor (DSP), an application specific integrated circuit (ASIC), a field programmable gate array (FPGA) or other programmable logic device, discrete gate or transistor logic, discrete hardware components, and any combination thereof designed to perform the functions described herein.

The steps of a method or algorithm described in connection with the embodiments disclosed herein may be implemented or performed directly in hardware, in a software module executed by a processor, or in combination of the two. A software module may reside in, but not limited to, RAM memory, flash memory, ROM memory, EPROM memory, EEPROM memory, registers, and any other form of storage medium in the art.

The previous description of the disclosed embodiments is provided to enable those skilled in the art to make or use the present invention. Various modifications to these embodiments will be readily apparent to those skilled in the art and generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of transmitting packet data in a wireless communication system, the method comprising:
   utilizing a base station to transmit an assignment message, and an initial data sub-packet, to a mobile station;
   utilizing the mobile station to decode the assignment message and the initial data sub-packet;
   utilizing the mobile station to send an ACKnowledgement (ACK) to the base station if the initial data sub-packet is decoded correctly, or to send a Negative ACKnowledgement (NACK) to the base station if the initial data sub-packet is decoded incorrectly;
   utilizing the base station to schedule HARQ re-transmission of the initial data sub-packet to the mobile station responsive to a Negative ACKnowledgement (NACK);
   utilizing an assignment message for HARQ re-transmission to transfer a plurality of parameters for re-transmission;
   utilizing a Media Access Control Index (MACID) field in the re-transmission assignment message to indicate identity of a mobile station targeted for the re-transmission; and
   transmitting the data sub-packet to the mobile station, and decoding the data sub-packet utilizing the mobile station, wherein the assignment message comprises a Packet Format field having a first value indicating that the sub-packet is for re-transmission of a previously failed data packet and the previously assigned modulation and coding scheme is being reduced by one level, and wherein each of the other values in the Packet Format field indicates that the first sub-packet of a new data packet is being transmitted using a transmission format uniquely associated with a Packet Format field value.

2. The method of claim 1, wherein the assignment message for re-transmission comprises a NodeID field adapted to identify frequency sub-carriers assigned to the mobile station.

3. The method of claim 2, wherein the NodeID in the assignment message for re-transmission is different from the NodeID in the assignment message for the previously failed transmission.

4. The method of claim 3, wherein the assignment message for re-transmission indicates that the NodeID in the assignment message supersedes the NodeID received in the assignment message for previous transmission.

5. The method of claim 3, wherein the assignment message for re-transmission indicates that the NodeID in the assignment message supplements the NodeID received in the assignment message for previous transmission.

6. The method of claim 1, wherein the assignment message for the new transmission and re-transmission includes the Packet Format field configured to indicate transmission format of the data packet.

7. The method of claim 6, wherein the Packet Format field further indicates new transmission or re-transmission status.

8. The method of claim 6, wherein the Packet Format field further indicates the status of modulation and coding scheme used for the re-transmission.

9. The method of claim 8, wherein in the assignment message:
   a second value in the Packet Format field indicates that the sub-packet is for re-transmission of a previously failed data packet, and that a previously assigned modulation and coding scheme is maintained.

* * * * *